US005878233A

United States Patent [19]
Schloss

[11] Patent Number: 5,878,233
[45] Date of Patent: *Mar. 2, 1999

[54] SYSTEM, METHOD, AND COMPUTER PROGRAM PRODUCT FOR REVIEWING AND CREATING ADVISORIES FOR DATA LOCATED ON A CONTENT SERVER

[75] Inventor: Robert Jeffrey Schloss, Briarcliff Manor, N.Y.

[73] Assignee: International Business Machines Corporation, Armonk, N.Y.

[ * ] Notice: The term of this patent shall not extend beyond the expiration date of Pat. No. 5,706,507.

[21] Appl. No.: 511,850

[22] Filed: Aug. 7, 1995

[51] Int. Cl.$^6$ .............................. G06F 13/38; G06F 15/17
[52] U.S. Cl. ................................ 395/200.55; 395/200.59; 395/200.33; 707/9; 705/39
[58] Field of Search .......................... 395/200.03, 200.09, 395/200.06, 200.12, 609, 610, 239, 200.31, 200.33, 200.47, 200.48, 200.55, 200.57, 200.59; 707/9, 10; 705/39

[56] References Cited

U.S. PATENT DOCUMENTS

| | | | |
|---|---|---|---|
| 5,263,157 | 11/1993 | Janis ................................... | 395/200.06 |
| 5,347,623 | 9/1994 | Takano et al. .......................... | 395/157 |
| 5,394,526 | 2/1995 | Crouse et al. .......................... | 395/200 |
| 5,408,600 | 4/1995 | Garfinkel et al. ....................... | 395/153 |
| 5,410,691 | 4/1995 | Taylor ................................. | 395/600 |
| 5,560,008 | 9/1996 | Johnson et al. ..................... | 395/200.09 |
| 5,561,706 | 10/1996 | Fenner ............................... | 395/200.09 |
| 5,572,643 | 11/1996 | Judson .............................. | 395/220.09 |
| 5,583,576 | 12/1996 | Perlman et al. . | |
| 5,619,657 | 4/1997 | Sudama et al. ..................... | 395/200.06 |
| 5,706,507 | 1/1998 | Schloss ....................................... | 707/9 |

OTHER PUBLICATIONS

"Sample Screenshots from ComMentor" http://www–diglib.stanford.edu/rms/tr/shots.

"Surfwatch" Current Press Releases http://www.surfwatch.com/ May 15, 1995.

Internet–Draft Internet Engineering Task Force KidCode Jun., 1995.

"Beyond Browsing: Shared Comments, SOAPs, Trails, and On–line Communities", M. Roscheisen et al., Computer Networks ISDN Systems (Netherlands), vol. 27, No. 6, pp. 739–749, Apr. 1995.

Heylighen, F.; "World–Wide Web: a distributed hypermedia paradigm for global networking"; Proceedings. Share Europe Spring Conference pp. 355–368, Apr. 18, 1994.

SmartFilter Press Release, "SmartFilter Protects Corporate Internet Productivity By Restricting Employee Access to Unwanted WWW Sites", Jun. 14, 1995, Webster Strategies, http://www.webster.com/wtprl.htm.

*Primary Examiner*—Mark H. Rinehart
*Attorney, Agent, or Firm*—Kevin M. Jordan

[57] ABSTRACT

A system and method which can efficiently develop new and revised advisories on content loaded (or available to be loaded) by a client from a content server via a protocol between the client and any number of advisory servers that maintain "ratings" knowledge bases. In one example, the advisory servers can be any number of independent non-co-located or combined servers in the World Wide Web. Alternatively, the functions of the advisory server can be integrated with the functions of the content server. Advisories can be efficiently developed based on rational factors, including: suggestions from users of an advisory service; as yet unrated content for which queries are being received; and requests from providers of new and revised primary content. Embodiments of the operation of an advisory server and reviewer's tool are described wherein content which clients are sending queries about, but which have not yet been reviewed, (i.e., not stored in an advisories database) are placed on a to-be-reviewed queue for processing by the reviewer's tool. New and revised advisories may also be created as a result of suggested advisories submitted from clients. New and revised advisories may further be created as a result of new or revised content for which a primary publisher desires (and may wish to pay for) an advisory.

47 Claims, 14 Drawing Sheets

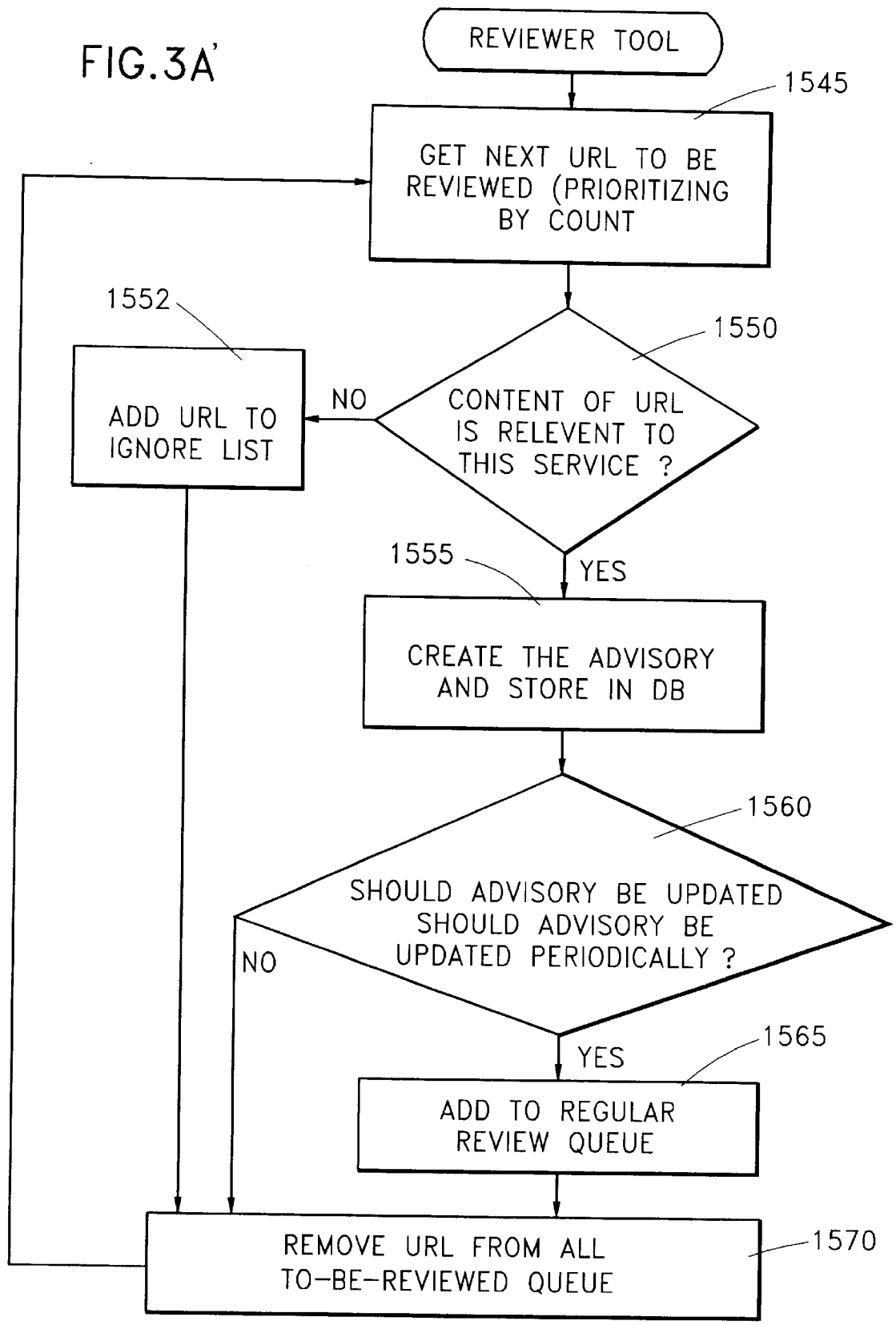

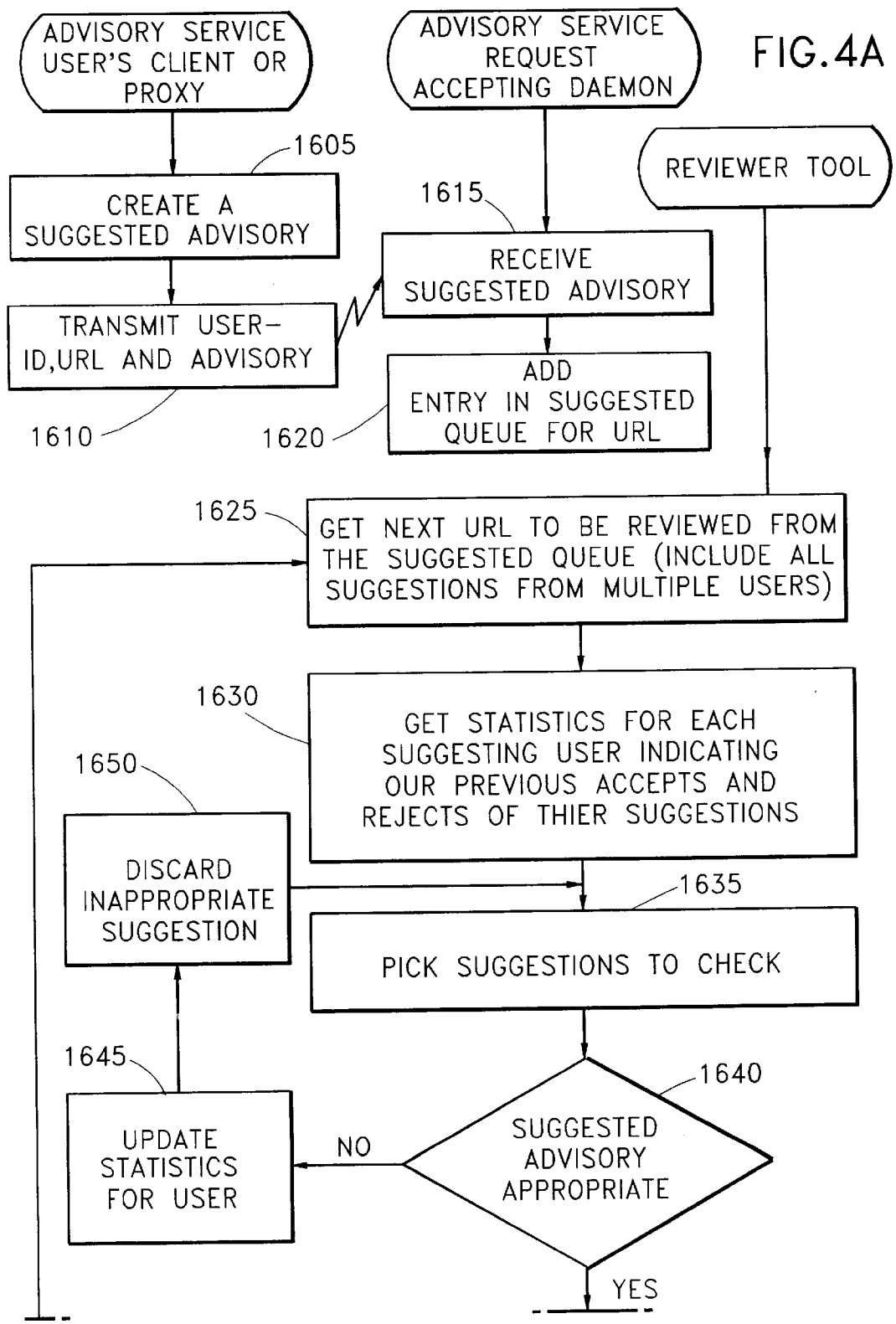

SYSTEM, METHOD, AND COMPUTER PROGRAM PRODUCT FOR REVIEWING AND CREATING ADVISORIES FOR DATA LOCATED ON A CONTENT SERVER

CROSS-REFERENCE TO RELATED PATENT

The present invention is related in subject mater to U.S. Pat. No. 5,706,507, entitled "System and Method for Controlling Access to Data Located on a Content Server," issued Jan. 6, 1998 to Schloss. This patent, which is commonly assigned to the assignee of the present invention, is hereby incorporated herein by reference in its entirety.

FIELD OF THE INVENTION

The present invention is related to distributed data communication systems, and more particularly, to controlling access, to providing meta-information about, data located on content servers in distributed data communication systems.

BACKGROUND OF THE INVENTION

Electronic online information services that contain documents (as opposed to structured databases and transaction systems) emerged in the 1960s. These first generation services held all content on one server (such as DIALOG). Therefore, users normally understood the characteristics of the documents based on which service they used. Distributed online information services began with networked bulletin board systems such as UUCP, USENET, FIDOnet. However, these services were used by a tiny section of the population ad did not contain data that was used to make important personal or business decisions. A third generation of online information emerged at the end of the 1980s as the Internet became common on college campuses, businesses and government agencies. The World Wide Web was developed under the leadership of Tim Berners-Lee of CERN, as a method of fetching information from any cooperating computer on the Internet by simply clicking on a reference to that information. With the release of the first high-function Web browser program, Mosaic, by the National Center for Supercomputer Applications in early 1994, millions of users began to have access to millions of documents through the World Wide Web. These documents contain text, graphics, audio, video, etc.

The World Wide Web contains information that is updated regularly, and therefore is in many ways superior to consulting books or CD-ROMs. However, users may have trouble contextualizing the retrieved information: was it accurate when posted (made available), is it still accurate now, etc. The challenge of editorial assessment of a huge body of constantly changing and growing information, with no central depository site, forces users to depend upon independent assessments of the retrieved data. Users are familiar with doing this in other domains, such as "the Good Housekeeping Seal of Approval" for household goods.

It was recognized by the W3 Consortium and other voluntary standard groups for the World Wide Web that some automated mechanism of delivering assessments to users was needed. The urgent need for these items, ironically, is not being driven by business or other decision making based on Web information, but by a need to have filtering of adult-only material from young people who access the Web. Because it is easy to click from one document to another (which the one document points to) to another in seconds, this "traveling browsing" has become known as surfing the Web. In surfing the Web, children may have easy access to inappropriate videos, graphical data and other related information.

To address this issue, several mechanisms have been proposed and/or implemented. For example, the application sold under the trademark WATCHDOE by Surfwatch allows a supervisor (i.e. a parent) to block particular content from being retrieved when browsing the World Wide Web. On a subscription basis, users periodically receive disks that contain a data base of blocked sites. The user then executes a utility program that updates the existing data base of blocked sites with the updated data base of blocked sites in the disks. When the user browses on the Web, the application cross-references the data base and selectively blocks the loading of data from blocked sites identified in the data base.

Another application sold under the trademark WEBTRACK from Webster Network Strategies will block access to particular primary content sites, in 15 specific categories. Like SURFWATCH, WEBTRACK stores a list of blocked sites in a data base, and when the user browses the Web, the application cross-references the data base and selectively blocks the loading of data from block sites identified in the data base. However, in this case, the data base is not created and updated on a subscription basis, but may be created and updated by the supervisor.

KIDSCODE is an Internet Draft proposal which uses a naming convention to indicating ratings, and requires voluntary compliance by primary publisher of the content data.

The above applications fail to address the need for reviewer's tools which can efficiently develop new and revised advisories on content loaded (or available to be loaded) by a client from a content server via a protocol between the client and any number of independent non-co-located or combined advisory servers that maintain "ratings" knowledge bases.

It is therefore an object of the present invention to provide a system, method and computer program product for efficiently developing advisories based on rational factors, including, for example: suggestions from users of the advisory service; as yet unrated content for which queries are being received; and request from providers of new and revised primary content.

Additional objects and advantages of the present invention will be set forth in the description which follows, and in part will be obvious from the description, or may be learned by practicing the invention.

SUMMARY OF THE INVENTION

To achieve the objects in accordance with the purposes of the present invention, as embodied and described herein, a distributed data communication system comprises a content requestor and a content server. Communication between the content requestor and the content server occurs over a first communication link. The content requestor under control of user input communicates a data request signal to the content server over the first communication link. The content server, upon receiving the data request signal, communicates content data to the content requestor according to the data request signal. The characterization data is created and processed by:

setting said content requestor in an advisory mode wherein said content requestor communicates portions of said data request signal to a first advisory server over a second communication link different from said first communication link, and wherein said first advisory server is remote from said first content server;

upon receipt of said portions of said data request signal by said first advisory server, searching a data base coupled to said first advisory server for characterization data linked to said portions of said data request signal;

in the event said searching for said characterization data linked to said portions of said data request signal is unsuccessful, storing said portions of said data request signal in a review queue associated with said advisory server; and retrieving said portion of said data request signal stored in said review queue and creating and storing said characterization data linked to said portions of said data request signal in said data base.

BRIEF DESCRIPTION OF THE DRAWINGS

FIGS. 3b and 3c are illustrations of the data flow in a system in accordance with the method of FIG. 3a;

FIG. 4b show a data flow in a system in accordance with the method of FIG. 4a;

FIG. 5b shows a data flow in a system in accordance with the method of FIG. 5a.

DETAILED DESCRIPTION OF THE PRESENT INVENTION

Figure 1:
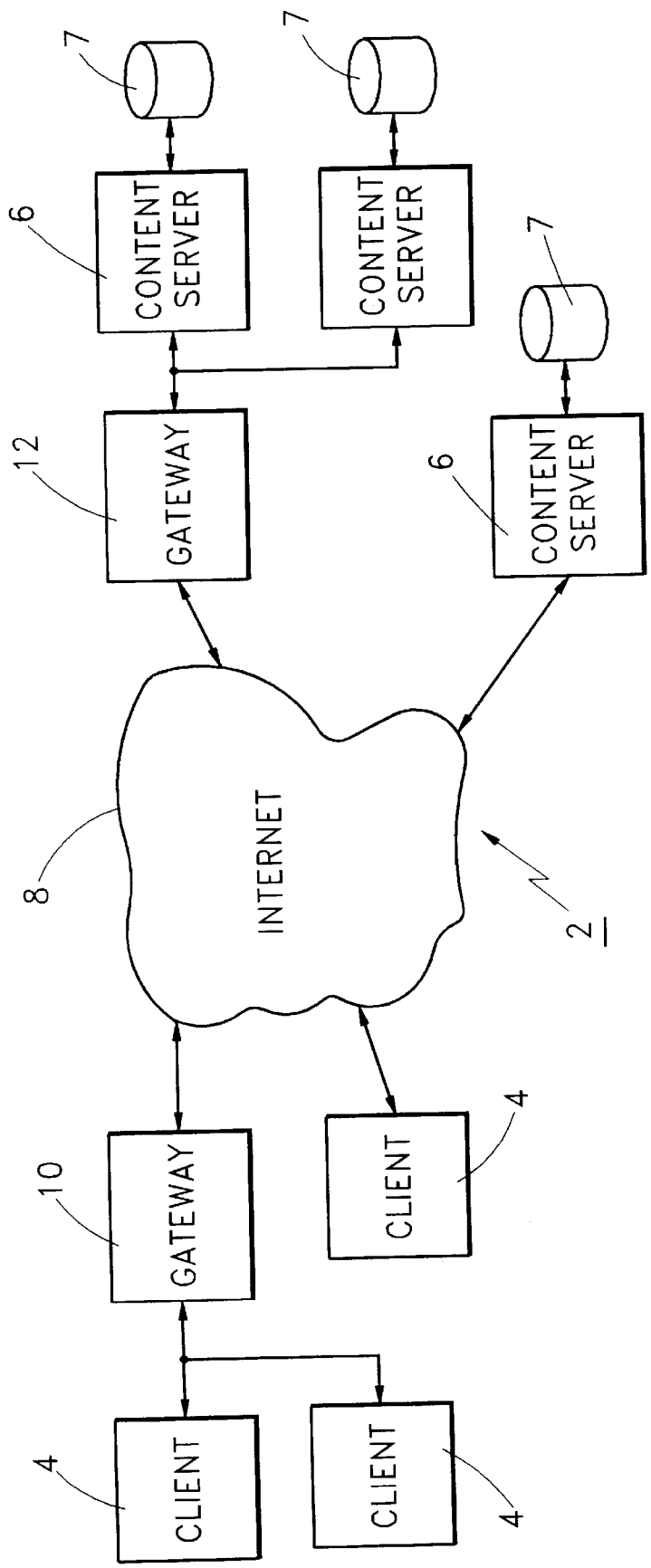
FIG. 1 is a pictorial representation of the Internet World Wide Web wherein a Client running a Web Browser requests content data from a Content Server.

FIG. 1 is a pictorial representation of the Internet World Wide Web, commonly called the Web. The present invention as described below is embodied in the World Wide Web, but the invention is not limited in this respect, and may be embodied in any data communication system wherein a content requesting system requests data from a content serve, including but not limited to on-line information services, telephone networks, and television networks.

As shown in FIG. 1, the Web 2 includes a plurality of clients 4 (three shown) that interface to a plurality of content servers 6 (three shown) over the Internet 8. The content servers retrieve and/or generate content data from information stored in a data base 7 associated with the content server 6. Typically, the data base resides on a hard disk associated with the content server. A gateway 10 may be utilized to interface more than one client 4 to the Internet 8 as shown. Typically, the gateway 10 functions as a proxy server to cache the most recently requested content data to control access to the Internet 8 to only specified clients 4, and for billing the clients 4 for access to the Internet 8. In addition, a gateway 12 may be utilized to interface more than one content server 6 to the Internet 8 as shown. In this case, the gateway 12 typically functions as a firewall to control access to the content servers to authorized users, and the centralized billing of access to the content servers, if appropriate. Note that one or more clients 4 may be linked to one or more content servers over a local area network. In this case, the functions of the gateway 10 and 12 may be integrated into a single gateway that interfaces to the local area network.

Users utilize a client system running a Web Browser, such as those sold under the trademarks NETSCAPE NAVIGATOR, IBM WEB EXPLORER and NSCA MOSAIC, to load content located on the content servers 6. The content may be in one of several standardized formats, with hyperlink anchors in one "page" of content pointing to other content that may be on the same server or on another remote server.

More specifically, a client system running a Web Browser requests content from a content server 6 using a Hypertext Protocol (HTTP) request and receiving the content in a HTTP response. HTTP requests and responses occur over TCP/IC sockets that are communicated over the communication link between the client 4 and the content server 6. Much World Wide Web content consists of readable pages encoded using the Hypertext Markup content server 6 or by clicking on a hyperlink anchor 132 which points to content stored on Language (HTML). Thus, the word "page" and the work "content" are used interchangeably below. The user may generate the content request by explicitly asking for content stored on the content server 6. Upon receipt, the browser loads that content using an HTTP session. A more detailed description of HTTP may be found in Berners-Lee et al., "Hypertext Transfer Protocol—HTTP/1.0", draft-ieft-http-v10-spec-0.0. txt, 1995 Mar. 8 (Internet Draft), herein incorporated by reference in its entirety. A more detailed description of HTML may be found in Berners-Lee, T. "Hypertext Markup Language (HTML)", draft ieft,iiir-html-01, Jun. 1993 (expired working draft), herein incorporated by reference in its entirety. And a more detailed description of TCP/IP sockets and communication on the Internet may be found in W. Richard Stevens, "TCP/IP Illustrated, Volume 1 — The Protocols", Addison-Wesley, 1994, pp. 1–20, 229–262, herein incorporated by reference in its entirety.

Figure 2:
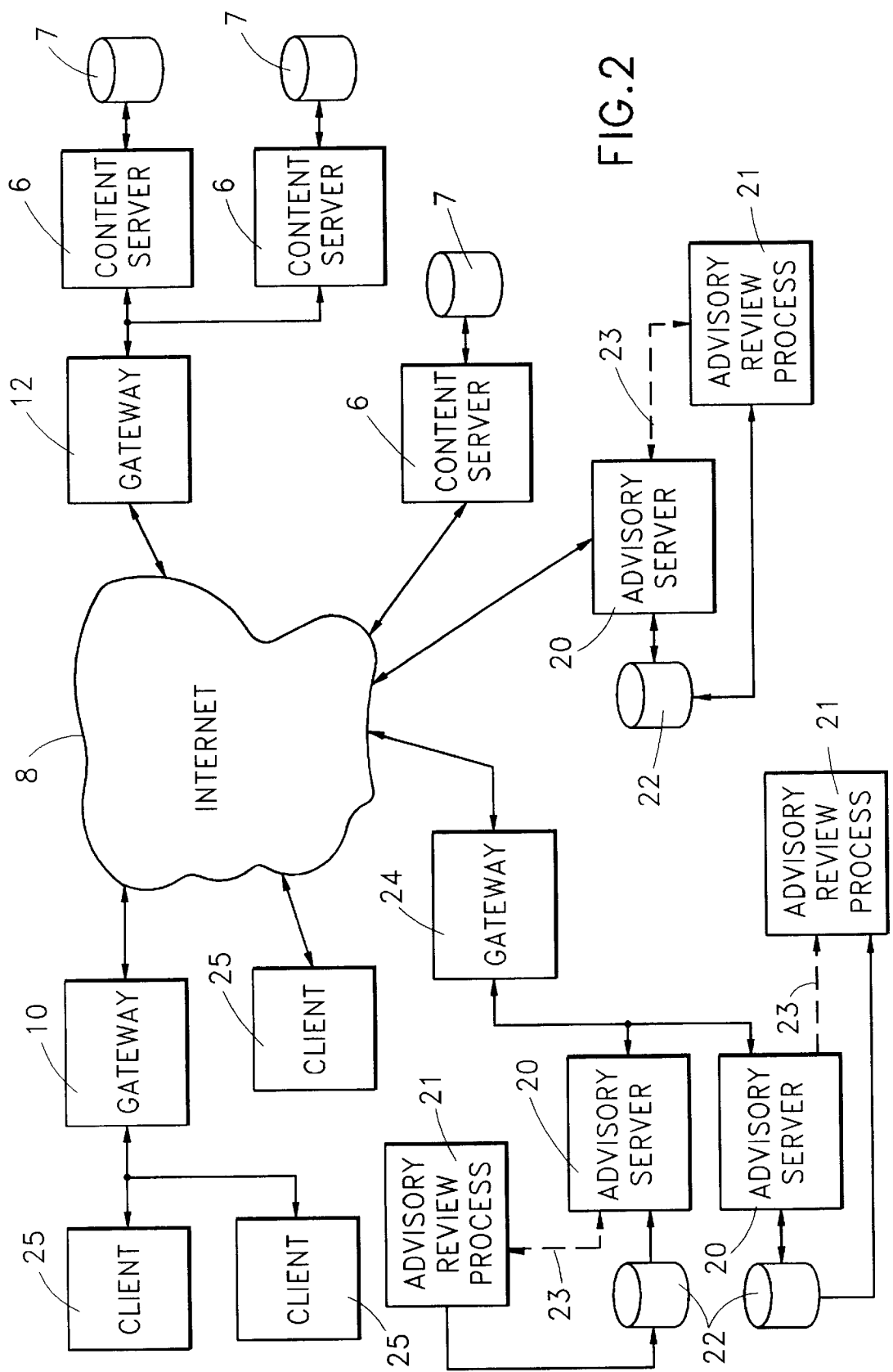
FIG. 2 is a pictorial representation of the World Wide Web including a client and one or more advisory servers incorporating the reviewer's tools according to the present invention.

According to the present invention, one or more advisory servers 20 (three shown) are interfaced to the Internet 8 as illustrated in FIG. 2. The advisory servers maintain one or more knowledge bases 22 that characterize the content generated by one or more of the content servers 6. The system also includes an advisory review process 21 (reviewer's tool) which allows an advisory service to develop new and revised advisories. In addition, the system includes one or more clients 25 (three shown) running a Web Browser that when set in an advisory mode, for each content request to the content servers 6, requests characterization data from one or more of the advisory servers 20. The advisory servers 20 generate the appropriate characterization data based upon the information stored in the knowledge base 22, and transmit the characterization data to the client 25 via the Internet 8. Upon receiving the characterization data, the client 25 utilizes the characterization data to determine whether to filter the content data transmitted by the content server 6. In addition, the client may utilize the characterization data to generate additional information. The operation of the system in filtering the content data and generating the additional information can be found in aforementioned U.S. Pat. No. 5,706,507, entitled "System and Method for Controlling Access to Data Located on a Content Server," issued Jan. 6, 1998 to Schloss. The advisory servers, when active, are preferably placed on an active list that identifies each active advisory server, for example by storing the URL of the advisory server 20. A more detailed description of URLs may be found in Berners-Lee et al., "Uniform Resource Locators (URL)", RFC 1738, Dec. 1994, herein incorporated by reference in its entirety.

Figure 4A:
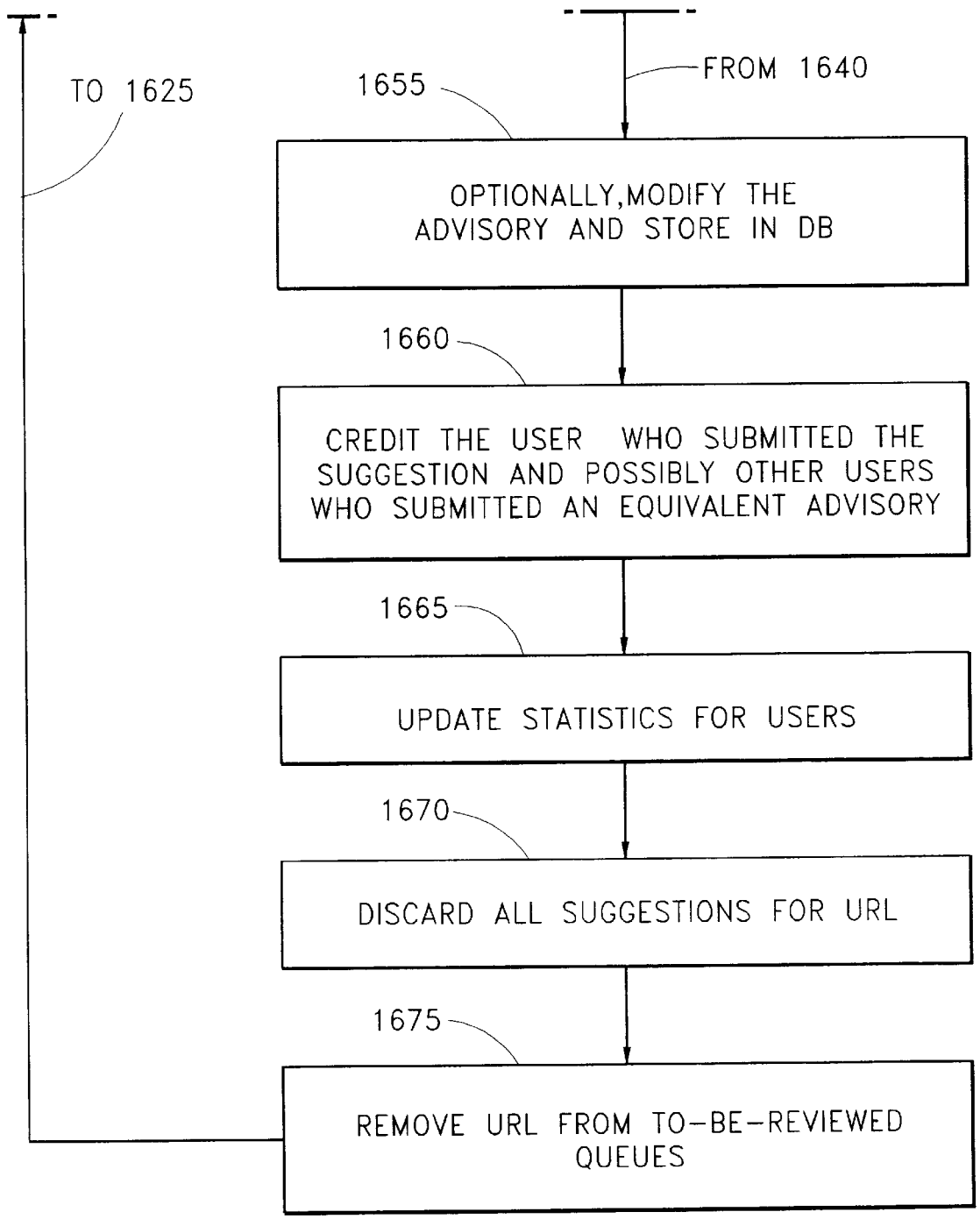
FIGS. 4a and 4a' is a flowchart of a method allowing users of an advisory service to submit suggested advisories which are subsequently processed by the reviewer's tool of the present invention.
Figure 4B:
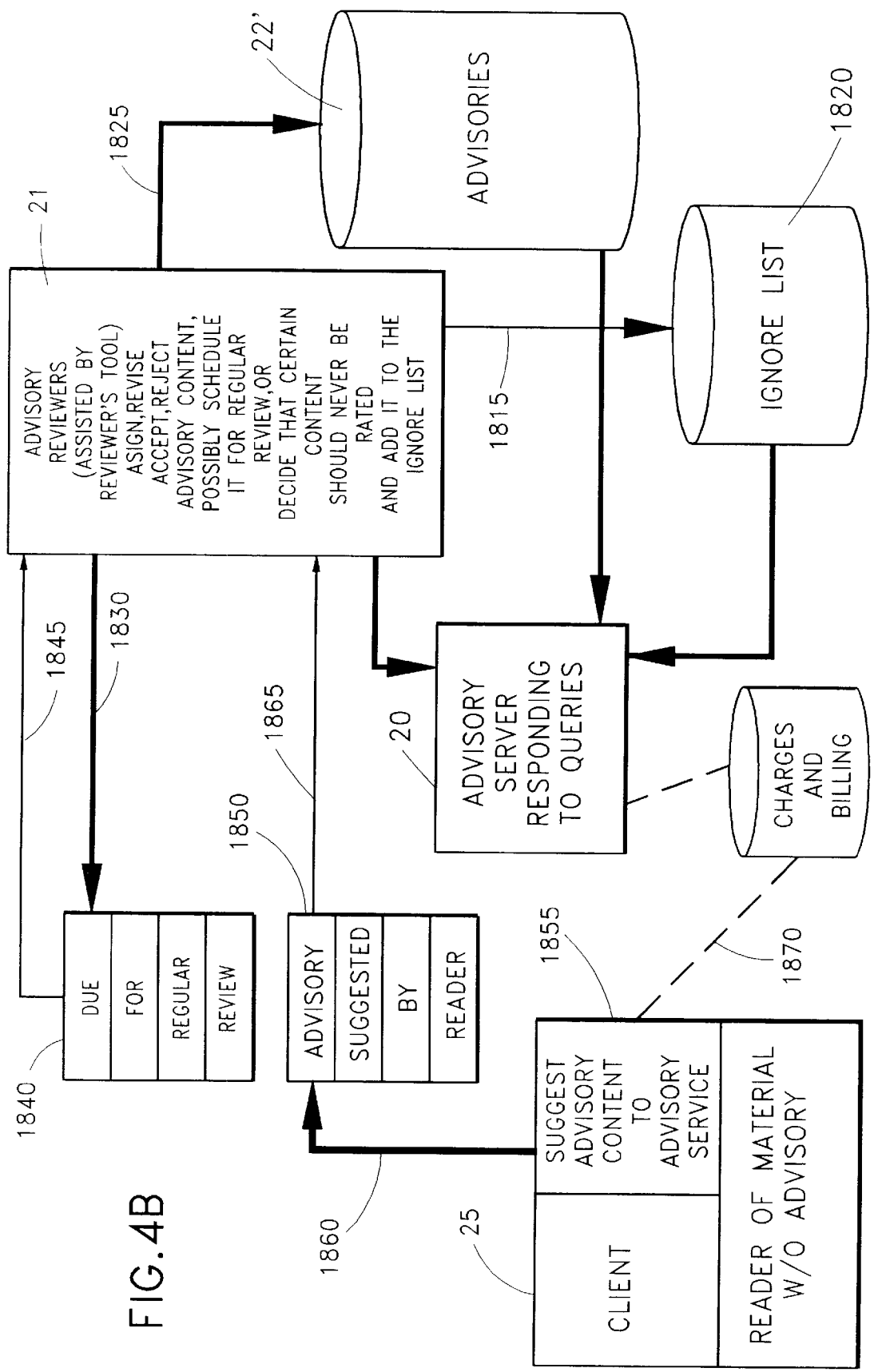
Figure 4C:
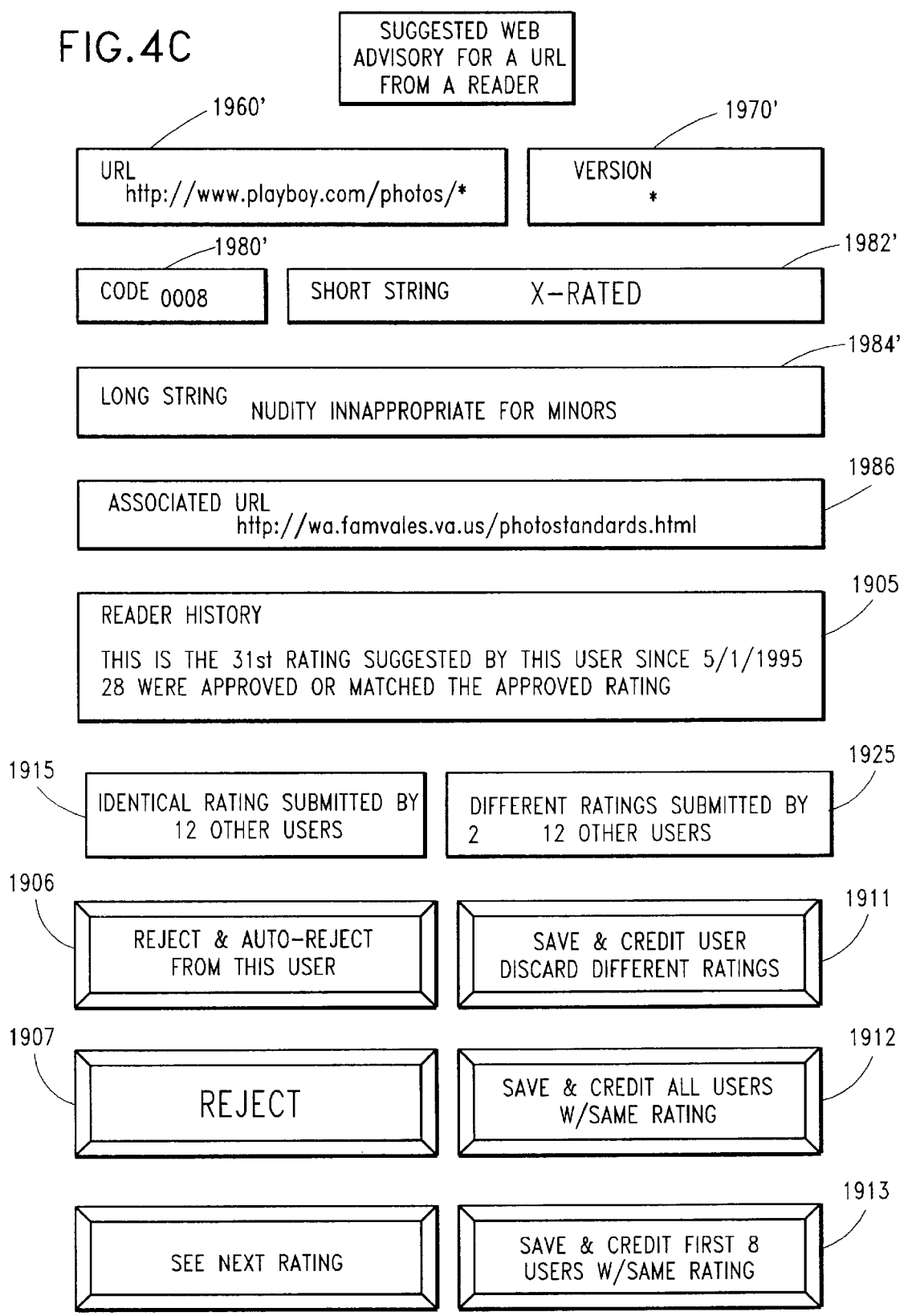
FIG. 4c illustrates a dialog box in accordance with the present invention which may be used by reviewers to process an advisory suggested by a user for an unrated URL.
Figure 5A:
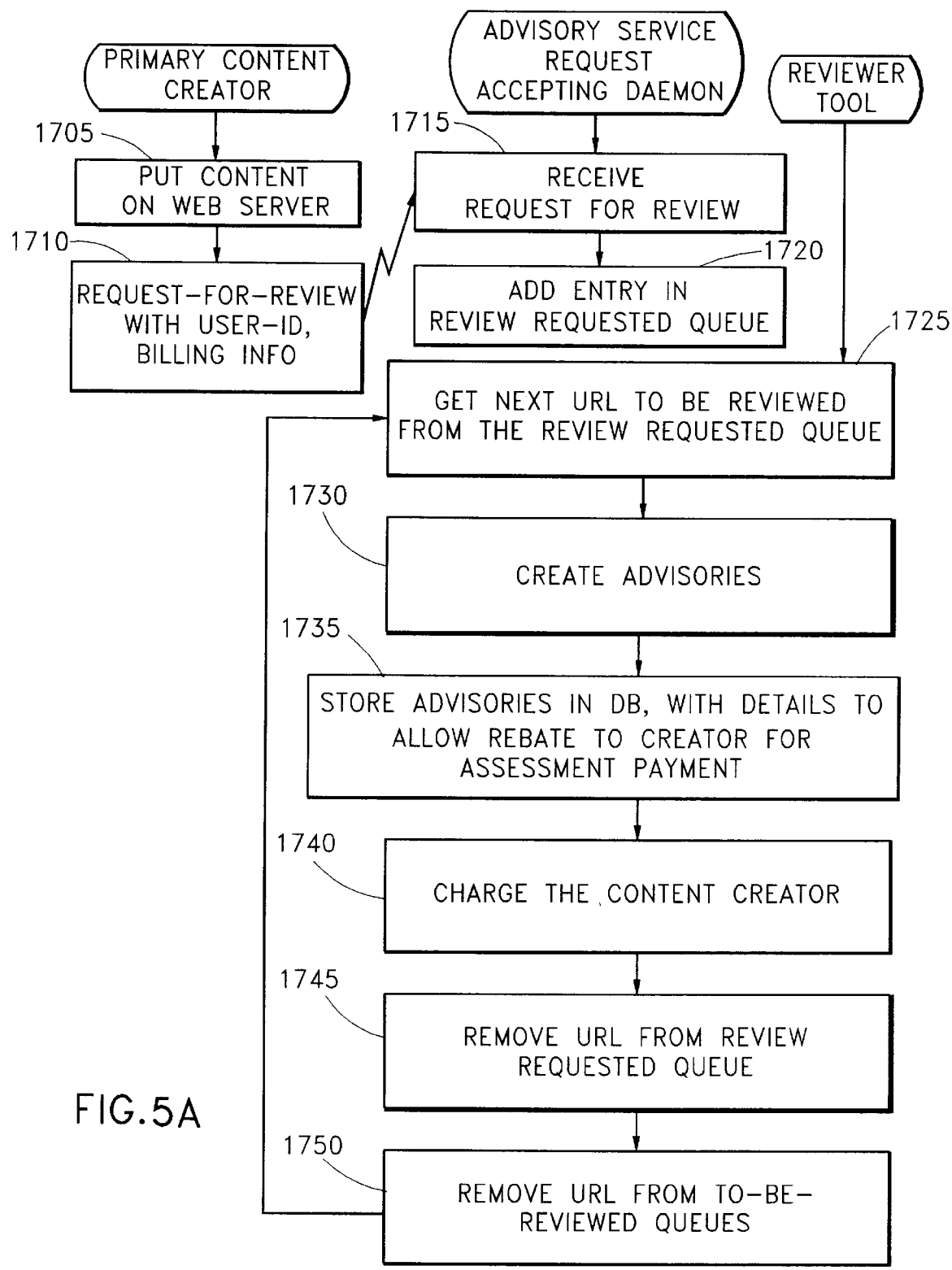
FIG. 5a is a flow chart illustrating an embodiment of a method according to the present invention allowing primary content creators to submit and an advisory server and reviewer's tool to efficiently process advisories submitted thereby.
Figure 5B:
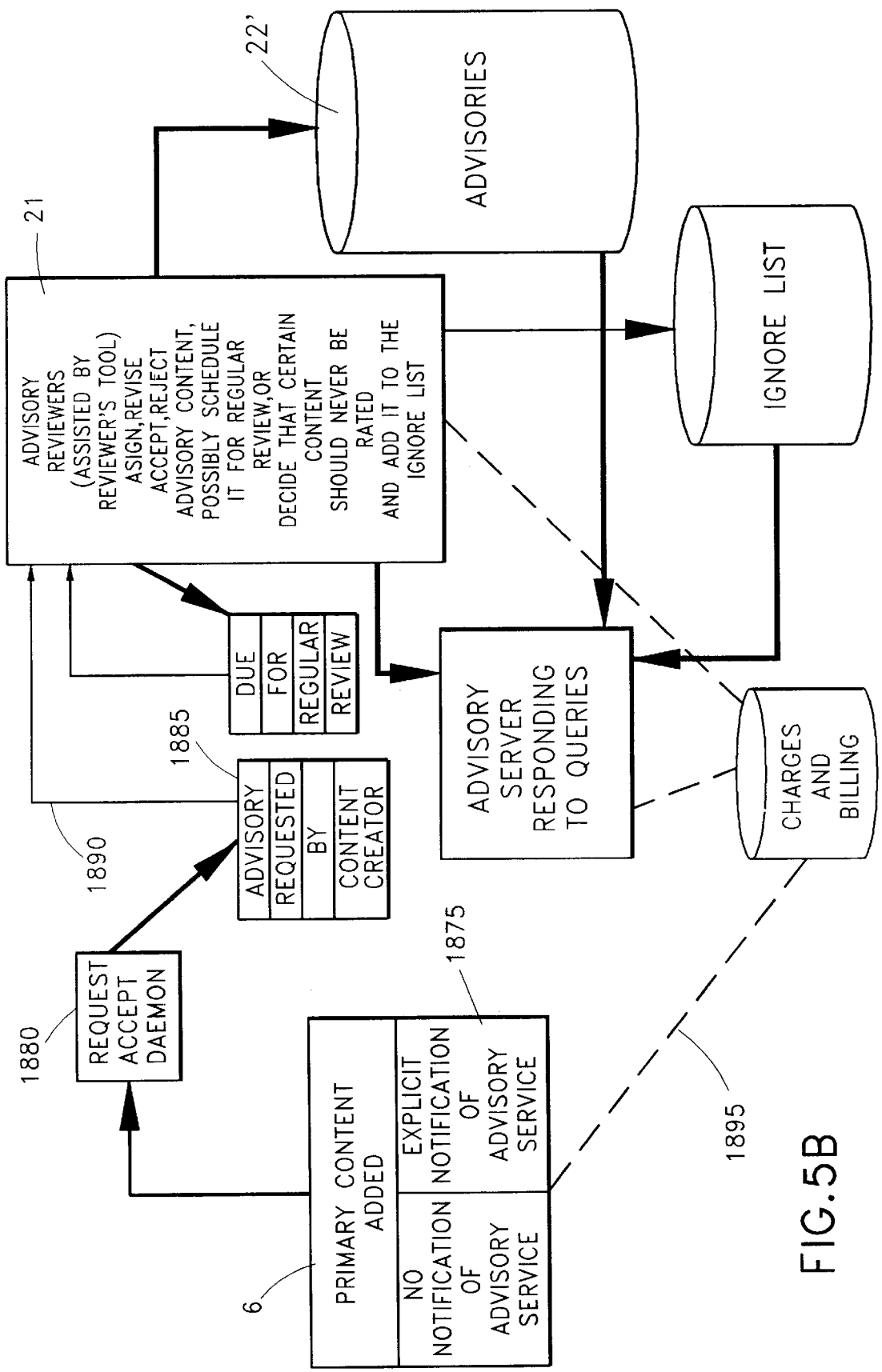

The aforementioned new and revised advisories may be developed based on rational factors. For example, FIGS. 3a–3e show a flow chart, data flows, and user interfaces illustrating embodiments of the operation of an advisory server and reviewer's tool according to the present invention whereby content which clients are sending queries about but which have not yet been reviewed, i.e., not stored in the advisories database 21, are placed on a to-be-reviewed queue for processing by the reviewer's tool. New and revised advisories may also be created as a result of suggested advisories subjected from clients as shown in FIGS. 4a–4c. New and revised advisories may further be created as a result of new or revised content for which a primary publisher desires (and may wish to pay for) an advisory, as shown in FIGS. 5a and 5b.

Those skilled in the art will appreciate that the Advisory review process 21 (reviewer's tool) may be running on the same or a different machine than the advisory server 20 as illustrated by the dotted line 23 therebetween. In either event, the advisory server 20 preferably caches database 22 entries in main memory so that the actual storing of database entries is accomplished through the advisory server 20. The reviewer's tool request to store the advisory would thus cause the advisory server to update both its cache and the advisory database.

Those skilled in the art will also appreciate that it is possible for the functions of the advisory server 20 to be integrated with the functions of the content server 6, but typically this will not be the case. Preferably, the Web Advisory Transfer Protocol (WATP) is used to communicate between the client 25 running the Web Browser and the advisory server 20. WATP is described in the aforementioned U.S. Pat. No. 5,706,507, entitled "System and Method for Controlling Access to Data Located on a Content Server," issued Jan. 6, 1998 to Schloss. Note that more than one advisory server 20 may be interfaced to the Internet 8 by a gateway 24. The gateway 24 may function as a firewall to control access to the advisory server 20 to authorized users, and for centralized billing of access to the advisory servers, if appropriate.

By way of overview, FIGS. 3a, 3b, 3c, 3d, and 3c show how users of the advisory service, after accessing unrated primary content, initiate a process in which a reviewer, utilizing an embodiment of the present invention may later create new or revised advisories rating this content or may mark it as being of no interest to the service.

Figure 3A:
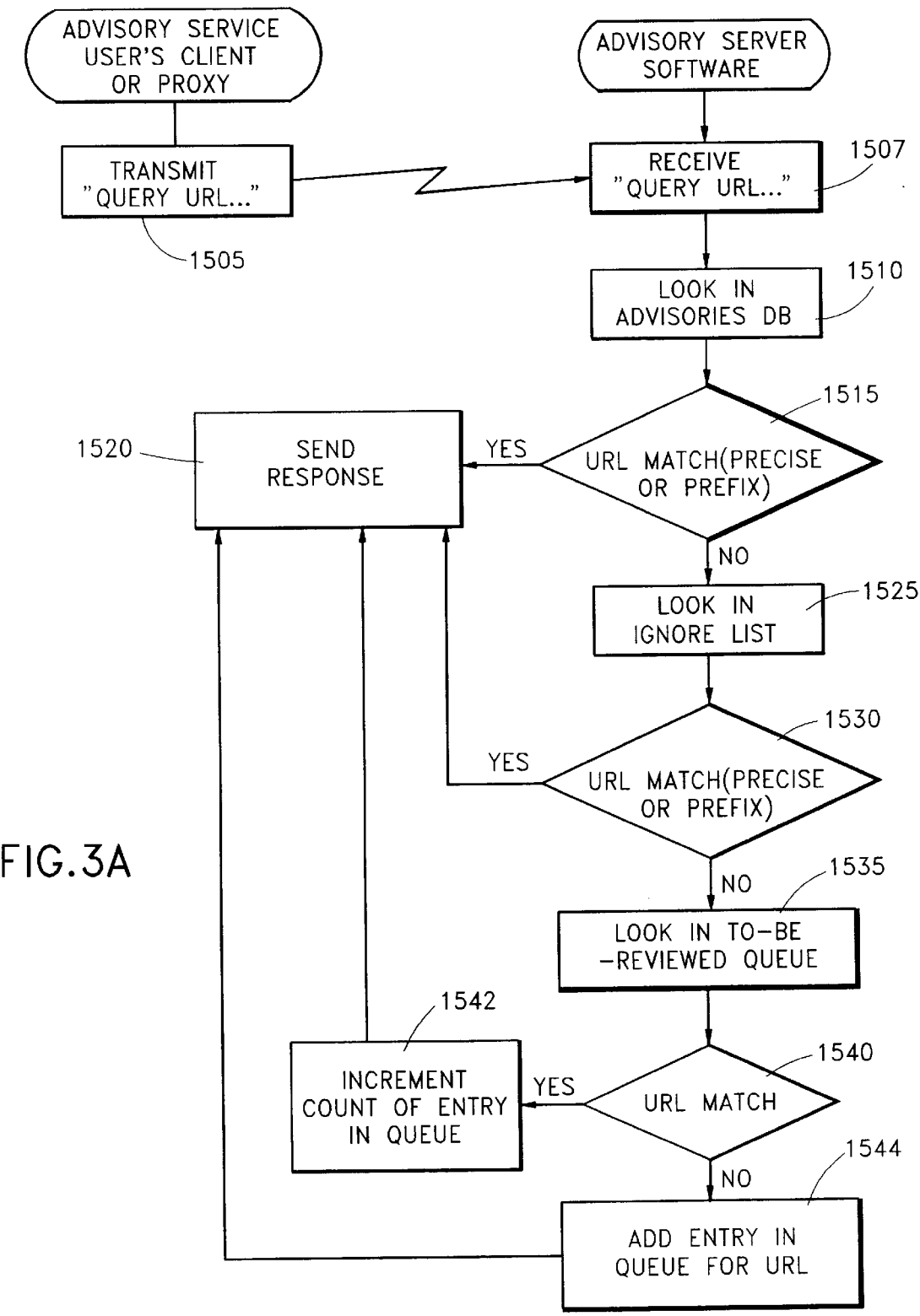
FIGS. 3a and 3a' is a flow chart illustrating an embodiment of a method of operation of an advisory server and reviewer's tool according to the present invention.

Specifically, FIG. 3a is a flowchart embodying the aforementioned process according to the present invention. Referring to FIG. 3a, in step 1505, a user's client 25 transmits a request for an advisory on a URL (ID) having associated content to an advisory server 20. In step 1507 the advisory server 20 receives the query. In steps 1510 through 1530 it is preferred that the advisory server has searched both the advisories database 22 and an Ignore list which contains a list of IDs to be ignored and has not found a match on the URL or some predetermined prefix thereof. In steps 1530 and 1535 the advisory server searches a to-be-reviewed queue for a match on the URL. In step 1542, it a match is found, the advisory server may increment a counter which tracks the number of queries received on each URL, e.g., to increase the review priority for the associated content, and sends, in step 1520, an appropriate response to the user's client 25. In step 1544, if no match is found, an entry may be added to the to-be-reviewed queue for the queried URL, and an appropriate response is again sent, in step 1520, to the user's client 25.

Those skilled in the art will appreciate that the initiation of the advisory review process may be asynchronous with the process of determining whether a URL will be added to the review queue (shown in steps 1505–1542). Thus, in step 1545, preferably at a time convenient for the advisory service, the reviewer tool initiates the advisory review process 21 of the present invention. In the preferred embodiment, the reviewer's tool includes a user interface as shown in FIGS. 3d–3e that allows a human reviewer (reviewer) to interact therewith. Those skilled in the art will also appreciate that automation may also be put in place to accomplish at least some of the tasks of the human reviewer without departing from the spirit of the present invention. Returning now to FIG. 3a, in step 1545, a URL needing review may be chosen by the reviewer from the to-be-reviewed-queue. In step 1550, if the reviewer decides the associated content is beyond the scope of or irrelevant to this advisory service, the URL may be added to the ignore list, in step 1552. The addition of the URL to the ignore list may be used to ensure that any future loading of the URL by clients will not put the URL back on the To-Be-Reviewed Queue (as shown in steps 1525 and 1530). In step 1550, if the content is relevant to the advisory service, an advisory is created in step 1555 and stored in the database 22. In step 1560, if the content itself or its assessment may change periodically, the URL may be added, in step 1565, to one of several regularly timed review queues, such as "Review each week on Monday". Finally, in step 1570, once the advisory has been created, the URL is preferably removed from this queue and from other queues which may contain suggested advisories from other users.

Figure 3B:
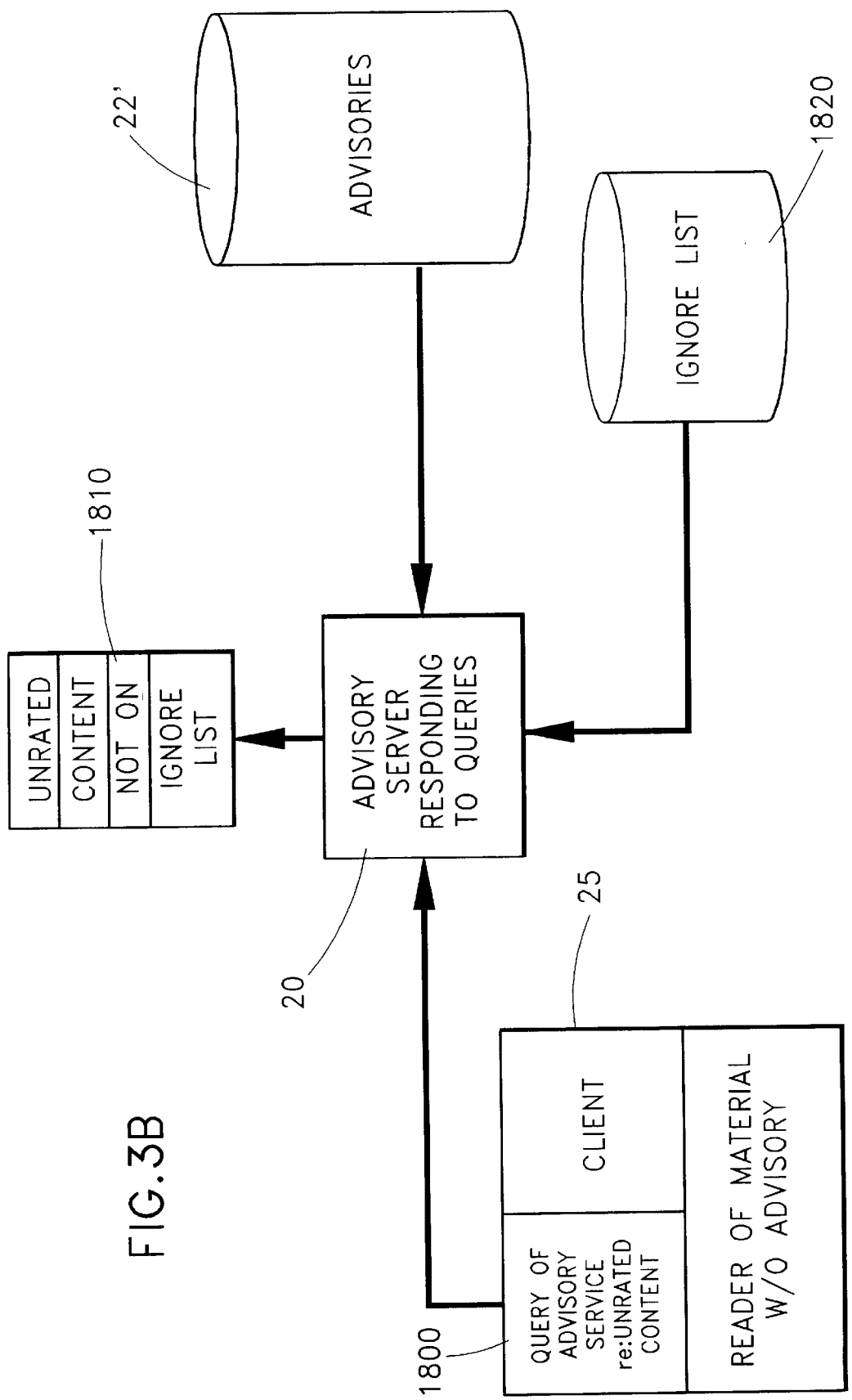

FIG. 3b illustrates a data flow in a system in accordance with the method of FIG. 3a steps 1505 through 1544. A client 25 communicates a query a query 1800 to the advisory server 20, e.g., for a URL having associated content that has not been rated. Thus, in this embodiment it is assumed that when the advisory server 20 receives the query, it looks in the advisory database 22' and finds no entry. For brevity, it is also assumed there is no entry on the ignore list 1820. As a result, the advisory server 20 adds the URL to the To-Be-Reviewed Queue 1810 which may be stored in database 22.

Figure 3C:
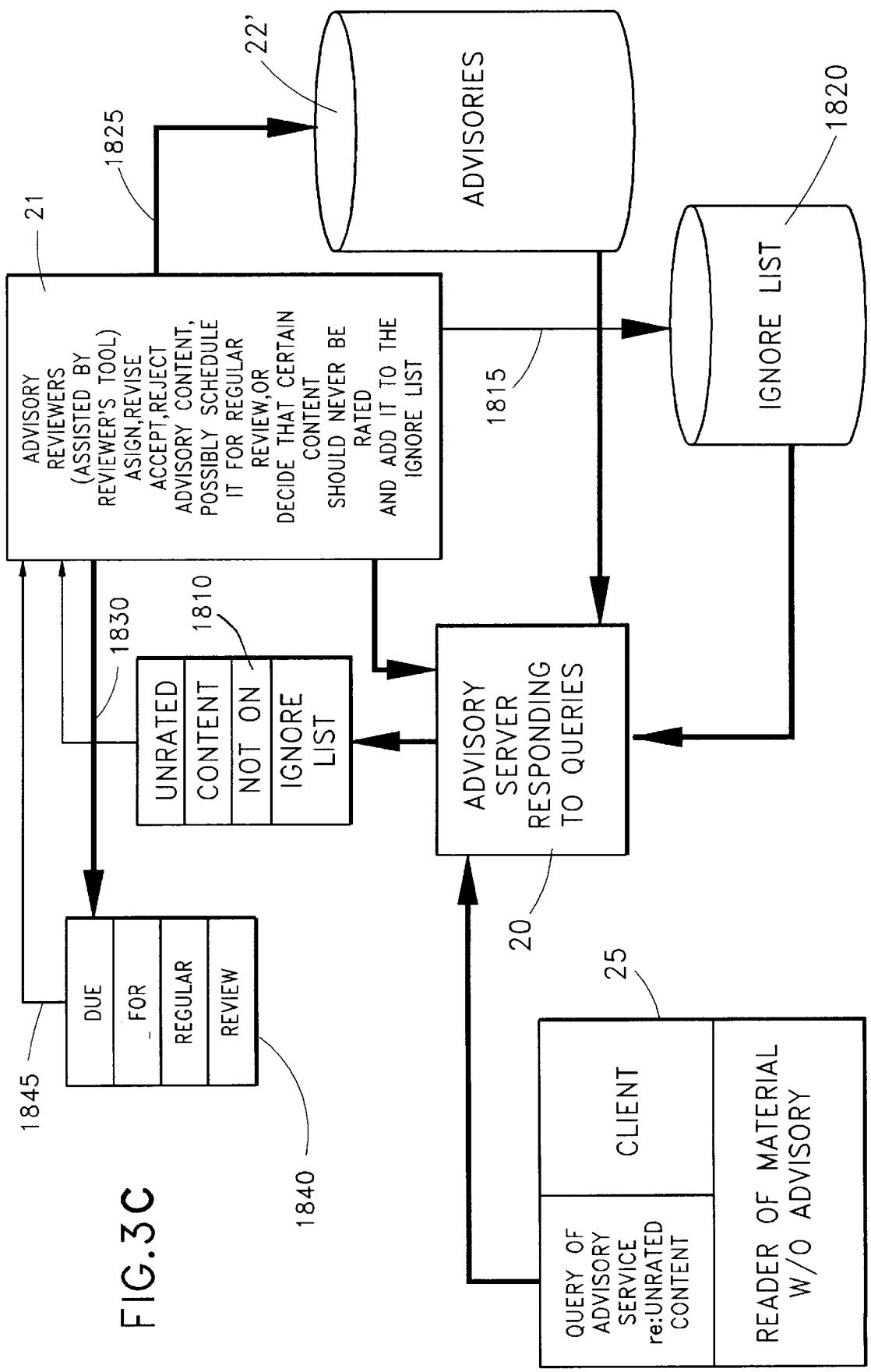
Figure 3D:
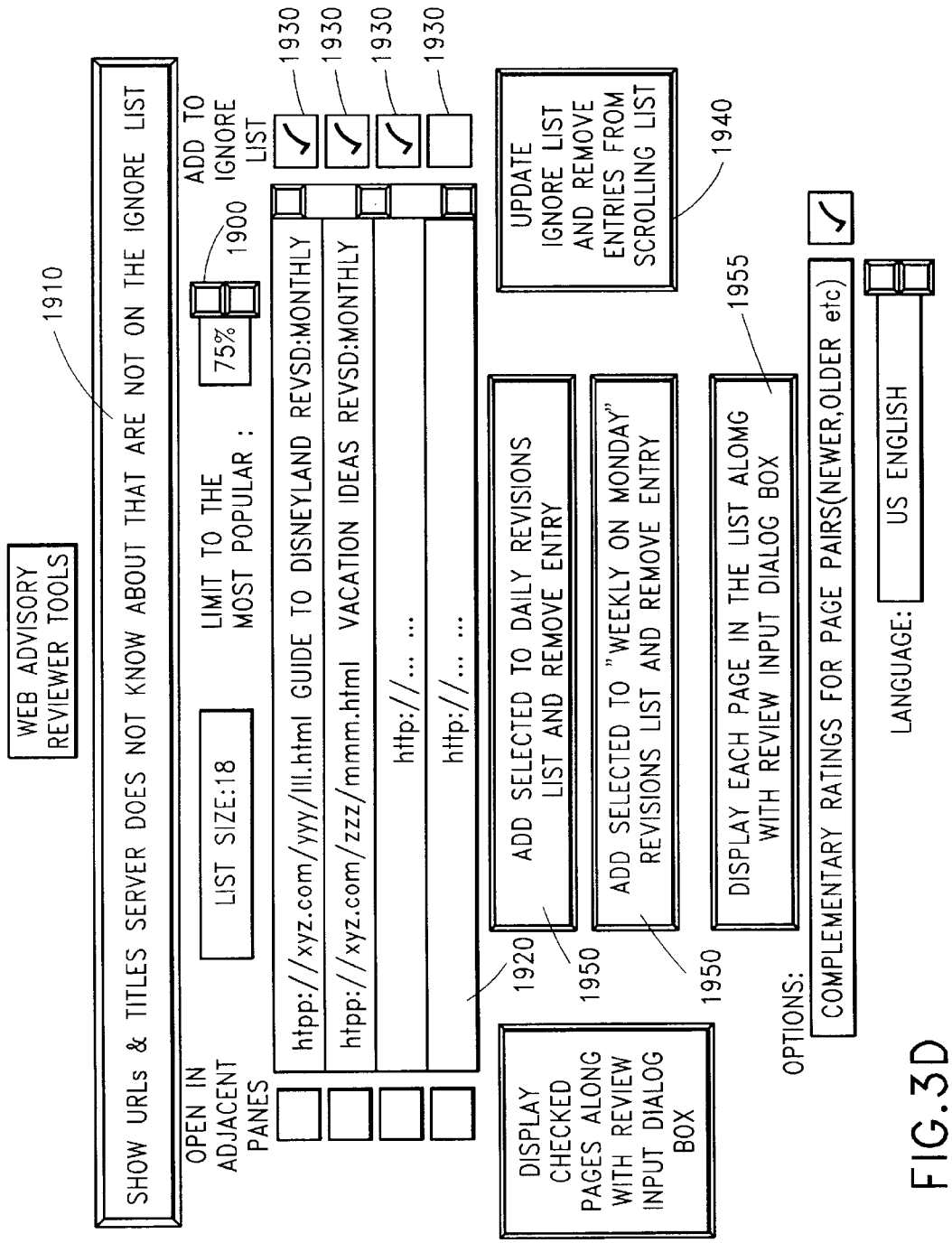
FIGS. 3d and 3e illustrate user interfaces for the reviewer's tool in accordance with the present invention for efficiently processing advisories on to-be-reviewed content.
Figure 3E:
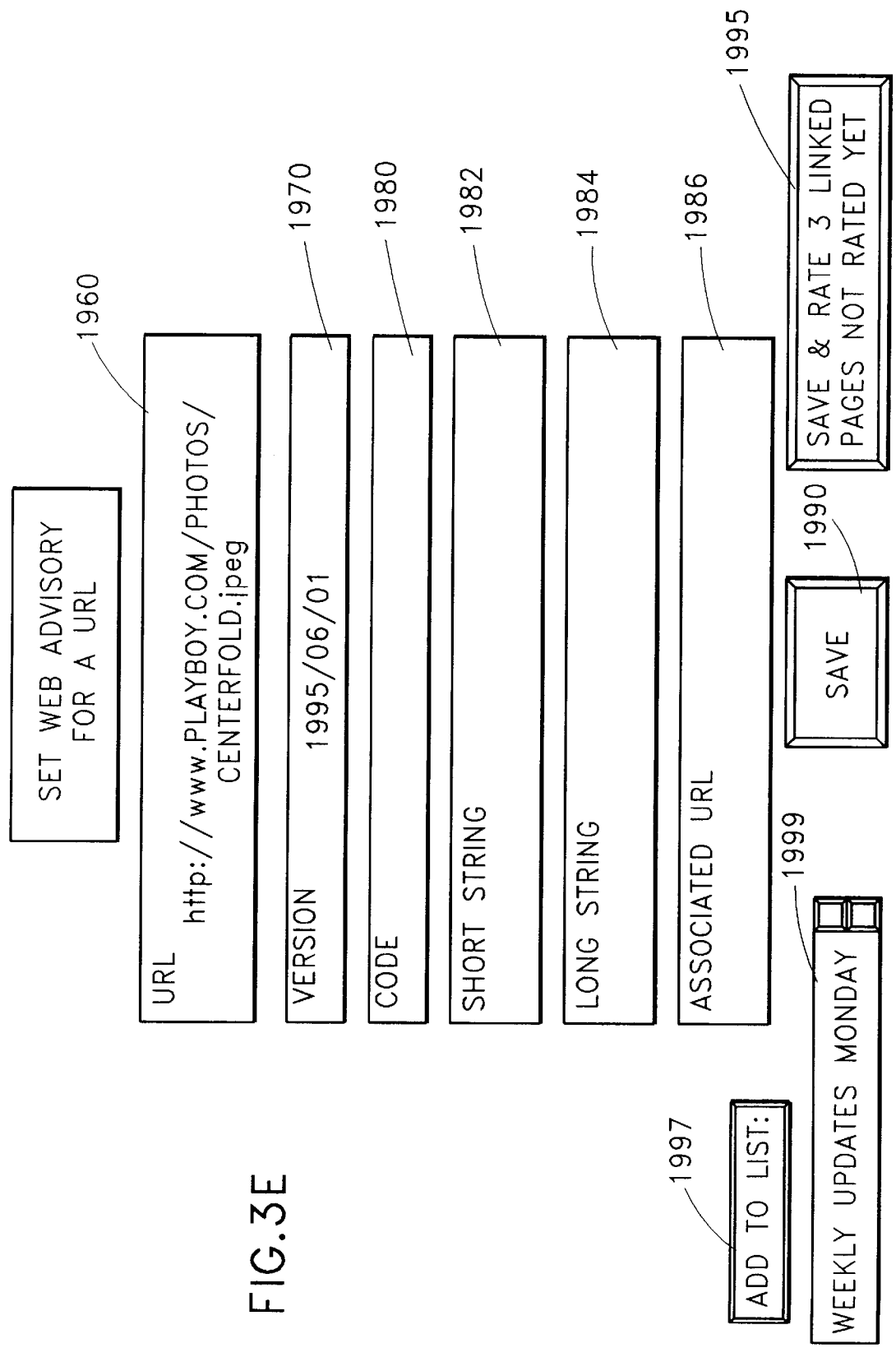

Referring now to FIG. 3c, a data flow is shown in a system in accordance with the method of the present invention as described in FIG. 3a step 1545 through 1570. The reviewer tool 21 removes a URL from the To-Be-Reviewed Queue 1810 via the data path to the advisory review process 21. The URL will either be stored via data path 1815 on the ignore list 1820 or an advisory will be created and stored via data path 1825 in the advisory database 22' via the advisory server 20. If regular re-review is called for, the URL may be stored via data path 1830 on an appropriate queue 1840, which will trigger subsequent re-review 1845.

FIG. 3d illustrates a dialog box in accordance with the present invention which may be used by reviewers to process suggested advisories, e.g., on a to-be-reviewed queue. Here, the reviewer has used the spin control 1900 to select the URLs which had the top 75% query counts on the To-Be-Reviewed queue, and then pressed the button 1910 labelled "Show URLs and Titles". For illustration only, the middle list box 1920 is shown containing 18 URLs, each with its title (taken from the HTML <TITLE> field) and optional information about how frequently the primary content creator revises them (monthly in this example). The reviewer (or automated process) may know from the titles that some URLs are irrelevant. The reviewer may then check boxes 1930 and press the button 1940 to update the ignore list 1820. For the remaining URLs, the reviewer could click on one or more lines of the list box 1902 and press the "Add selected . . . " buttons 1950 to more them to other queues. Alternately, the reviewer could press button 1955 to create advisories one at a time. This would show the page as well as the dialog box shown in FIG. 3e.

FIG. 3e illustrates a dialog box in accordance with the present invention which may be used by reviewers to create an advisory for a given URL. The interface may contain 2 fields, as shown at the top, to identify the URL 1960 and the version 1970, if applicable, of the content reviewed (the user may edit these create a URL prefix or apply to all versions, e.g., by the use of a wild-card). The interface also preferably includes 4 input fields; a return code 1980; a short string 1982; a long string 1984; and an associated URL 1986 (if applicable), for the advisory to be entered. The interface also preferably includes a Save button 1990 to trigger storing of the advisory. For convenience, the interface to the reviewer's tool may also provide a button 1995 allowing the user to review other (3 in this example) URLs which are pointed to by this page whose associated content are as yet unrated. Also for convenience, the user may use the "Add to list" button 1997 and the spin control 1999, which may contain the list of regular review queues, to add the URL 1960 to one of those lists.

By way of overview, FIGS. 4a, 4b, and 4c show how users of the advisory service may submit suggested advisories which are checked by the service's reviewers. FIG. 4a is a flowchart embodying the aforementioned process according to the present invention. FIG. 4b shows a data flow in a system in accordance with the method of FIG. 4a. FIG. 4c illustrates a dialog box in accordance with the present invention which may be used by reviewers to process an advisory suggested by a user for an unrated URL.

Specifically, FIG. 4a is a flowchart of a method according to the present invention showing how advisory service users may submit suggested advisories for subsequent consideration by the advisory service's reviewers. Users may be especially motivated to do so if the advisory service offers credits for proposed advisories which are accepted by the service. In step 1605, a client 25 creates a proposed advisory. In step 1610 the client 25 preferably transmits a structured e-mail including a user-ID, URL, and the proposed advisory for the associated content to an advisory server 20. In step 1615 the advisory server 20 receives the structured e-mail. In step 1620 the advisory server 20 adds an entry in a "suggested-queue" for the URL.

In step 1625, preferably at a time convenient for the advisory service, the reviewer tool 21 of the present invention begins to process the "suggested-queue". Since suggestions may have arrived from multiple users for this same URL, they may be retrieved as a group. In step 1630, statistics may be retrieved about the accept or reject actions that were taken regarding previous suggestions by the same users. A service that wishes to save reviewer time might use this information to look first at the suggestions from users whose previous suggestions were of statistically higher quality. In step 1635, one suggested advisory is displayed. In step 1640, the reviewer determines whether the proposed advisory is accepted. If not, in step 1645 the reviewer may update the user statistics, and reject it, in step 1650. If acceptable the advisory may be accepted, in step 1655 and/or modified before being stored. In step 1660, to encourage user suggestions, the user may be credited (perhaps along with other users who made the same suggestion close in time). The accepted statistics of these users is updated, in step 1665. The 'suggested-queue' may be cleared of all suggestions for this URL, in step 1670. Finally, the URL is preferably removed from all other To-Be-Reviewed queues that it may be on, in step 1675.

FIG. 4b illustrates a data flow in a system in accordance with the method of the present invention as shown in FIG. 4a. The client 25 creates a suggested advisory 1855 and transmits it via data path 1860 to the advisory server 20 where it goes on the suggested queue 1850. A reviewer initiates the reviewer's tool of the present invention and retrieves via data path 1865 the suggested advisory from the and (if acceptable) stores the advisory via data path 1825 (and the advisory server 20) into the advisory database 22'. If the advisory is rejected the URL may be put via data path 1815 on the ignore list 1820. If the suggestion was accepted by the reviewer, the user may be sent credit via data path 1870 for his suggestion.

FIG. 4c illustrates a dialog box in accordance with the present invention which may be used by reviewers to interface with the reviewer's tool of the present invention and process an advisory suggested by a user for an unrated URL. The interface shows a suggested advisory wherein the preferred fields include: the URL 1960'; the version 1970'; the return code 1980'; the short string 1982' that may be displayed to users upon subsequent requests for advisories on this URL; the long string 1984'; and any associated URL 1986'. The user's suggestion statistics 1905 may also be displayed. Additional statistics, e.g., about suggestions submitted by other users 1915 and 1925 may also be included. Buttons may also be used to reject 1907 a single suggestion. All suggestions 1906 from a given user-id may also be blocked by the use of an appropriate blocking table. If the suggested advisory is approved it can be saved and the user(s) credited as shown by buttons 1911, 1912, and 1913.

FIGS. 5a, and 5b show how primary content creators may submit requests for review to an advisory service, where the cost of the review may be charged to the content creator who may later recover some of that payment.

Referring now to FIG. 5a, a flow chart of a method in accordance with the present invention shows how primary content creators may submit requests for review to an advisory service. In step 1705 primary content is added to or revised on a content server 6 by both formal and informal publishers who may wish to have an advisory on the content either issued or revised. In step 1710 the primary publisher transmits a characterization request via a structured e-mail preferably containing a user-id, the URL, and perhaps billing information. The advisory server 20 can be programmed to accept only a set of pre-approved user-ids or all user-ids (e.g., to encourage maximum participation). The characterization request could be submitted from a client associated directly with a content server 6 or from an independent client 4. Returning now to FIG. 5a, in step 1715 the request for review is received and in step 1720, added to the review-requested-queue. In step 1725, preferably at a time convenient for the advisory service, the Reviewer Tool of the present invention begins to process the review-requested-queue.

In step 1725, each URL is retrieved from the review-requested-queue and an advisory is created, in step 1730. In step 1735, the advisory is stored in the database 22' preferably with information to support a potential rebate if sufficient revenue is generated through advisory requests on this URL. The content creator is billed, in step 1740. The URL is removed from the review-requested-queue, in step 1745 and preferably from any other To-Be-Reviewed Queues it may appear on, in step 1750.

FIG. 5b shows a data flow in a system in accordance with the method of FIG. 5a. New or revised content is added to content server 6. The primary content creator transmits 1875 a request-for-review which is received by the request-accepting daemon 1880 who then places it on the review-requested-queue 1885. Those skilled in the art will appreciate that the review-requested-queue 1885 could be incorporated with review queue 1810 shown in FIG. 3c, without departing from the spirit of the present invention. Returning to FIG. 5b, the reviewer tool 21 may subsequently retrieve the request via data path 1890. After the reviewer creates the advisory it may be stored on the advisory database 22'. The primary content creator may be billed via data path 1895, if applicable or desirable.

Other embodiments of the invention will be apparent to those skilled in the art from consideration of the specification and practice of the invention disclosed herein. It is intended that the specification and examples be considered as examples only, with the true scope of the invention being indicated by the claims.

I claim:

1. A method of creating and processing characterization data associated with content data in a distributed data communication system of a type wherein communication between a content requestor and a first content server occurs over a first communication link, and wherein said content requestor under control of user input communicates a data request signal to said first content server over said first communication link, and wherein said first content server, upon receiving said data request signal, communicates said content data to said content requestor according to said data request signal, comprising the steps of:

setting said content requestor in an advisory mode wherein said content requestor communicates portions of said data request signal to a first advisory server over a second communication link different from said first communication link, and wherein said first advisory server is remote from said first content server;

upon receipt of said portions of said data request signal by said first advisory server, searching a data base coupled to said first advisory server for characterization data linked to said portions of said data request signal;

in the event said searching for said characterization data linked to said portions of said data request signal is unsuccessful, storing said portions of said data request signal in a review queue associated with said advisory server; and retrieving said portions of said data request signal stored in said review queue and creating and storing said characterization data linked to said portions of said data request signal in said data base.

2. The method of claim 1 wherein said retrieving step is performed asynchronously to said storing said portions of said data request signal.

3. The method of claim 1, wherein said step of retrieving said portions of said data request signal comprises the step of:

determining that the content data associated with said portions of said data request signal are not within the scope of said first advisory server; and storing said portions of said data request signal on an ignore queue coupled to said first advisory server wherein said ignore queue includes a list of said portions of said data request signal for which characterization data should not be generated.

4. The method of claim 3, wherein said searching a data base comprises the step of:

searching for and identifying said portions of said data request signal stored on said ignore queue.

5. The method of claim 1 wherein said step of creating and storing said characterization data linked to said portions of said data request signal in said data base comprises the step of:

identifying and adding said characterization data linked to said portions of said data request signal requiring periodic revision-review queue coupled to said advisory server.

6. The method of claim 1 wherein said searching for said characterization data linked to said portions of said data request signal is unsuccessful, comprises the steps of:

generating and communicating a data-not-found-response to said content requestor; and upon receipt of said portions of said data-not-found-response, said content requestor, in said advisory mode, creating and communicating a suggested characterization data to a suggested-queue coupled to said advisory server wherein said suggested characterization data includes data identifying said content requestor as well as said portions of said data request signal.

7. The method of claim 6, further comprises the step of:

controlling said first advisory server to retrieve said suggested characterization data from said suggested queue; and in the event said suggested characterization data is accepted, storing in said data base said suggested characterization data as characterization data linked to said portions of said data request signal in said data base.

8. The method of claim 7, wherein said controlling said first advisory server to retrieve said suggested characterization data from said suggested queue further comprises the step of:

modifying said suggested characterization data prior to said storing said suggested characterization data in said data base.

9. The method of claim 7, wherein said controlling said first advisory server to retrieve said suggested characterization data from said suggested queue further comprises the step of:

displaying said suggested characterization data on a display.

10. The method of claim 7, wherein said controlling said first advisory server to retrieve said suggested characterization data from said suggested queue further comprises the step of:

prioritizing said suggested queue as a function of the accept/reject ratio for prior suggested characterization data communicated from said content requestor.

11. The method of claim 7, when said suggested characterization data is accepted, further comprising the step of:

controlling said advisory server to generate a credit request signal responsive to said storing said suggested characterization data in said data base.

12. The method of claim 1, wherein said characterization data comprises a return code, a short string field, and a long string field.

13. A method of creating and revising characterization data associated with content data in a distributed data communication system of a type wherein communication between a content requestor and a first content server occurs over a first communication link, and wherein said content requestor under control of user input communicates a data request signal to said first content server over said first communication link, and wherein said first content server, upon receiving said data request signal, communicates said content data to sad content requestor according to said data request signal, comprising the steps of:

setting a characterization requestor associated with said first content server in an advisory mode wherein said characterization requestor communicates a request-for-review signal including portions of said data request signal, and an identification signal to a first advisory server over a second communication link different from said first communication link, wherein said first advisory server is remote form said first content server;

upon receipt of said portions of said request-for-review signal by said first advisory server, storing said request-for-review signal in a review queue coupled to said first advisory server; and retrieving said portions of said request-for-review signal stored in said review queue and creating and storing in said data base characterization data linked to said portions of said data request signal.

14. The method of claim 13 wherein said step of creating and storing in said data base said characterization data linked to said portions of said data request signal comprises the step of:

communicating a payment-request signal to said characterization requestor over said second communication link, wherein said payment-request signal includes the monetary charge incurred for said creating and storing in said data base said characterization data linked to said portions of said data request signal.

15. A system for creating and processing characterization data associated with content data in a distributed data communication system of a type wherein communication between a content requestor and a first content server occurs over a first communication link, and wherein said content requestor under control of user input communicates a data request signal to said first content server over said first communication link, and wherein said first content server, upon receiving said data request signal, communicates said content data to said content requestor according to said data request signal, comprising:

a first advisory server coupled to said content requestor over a second communication link different from said first communication link wherein said first advisory server is remote from said first content server;

a data base coupled to said first advisory server, said data base including characterization data which is linked to said portions of said data request signal;

setting means for setting said content requestor in an advisory mode wherein said content requestor communicates portions of said data request signal to said first advisory server over said second communication link;

searching means for searching said data base for said data base for said characterization data, responsive to receipt of said portions of said data request signal by said first advisory server;

a review queue associated with said advisory server for storing said portions of said data request signal associated with said advisory server, in the event said searching for said characterization data is unsuccessful;

retrieving means for retrieving said portions of said data request signal stored in said review queue; and creating means for creating and storing said characterization data in said data base.

16. The system of claim 15 wherein said retrieving means is performed asynchronously to said storing means.

17. The system of claim 15, wherein said retrieving means further comprises:

in the event that the content data associated with said portions of said data request signal are not within the scope of said first advisory server, storing means for storing said portions of said data request signal on an ignore queue coupled to said first advisory server wherein said ignore queue includes a list of said portions of said data request signal for which characterization data should not be generated.

18. The system of claim 17, wherein said searching means further comprises:

searching means for searching and identifying said portions of said data request signal stored on said ignore queue.

19. The system of claim 15 wherein said creating means further comprises:

identifying means for identifying and adding said characterization data requiring periodic revision to a periodic-review queue coupled to said advisory server.

20. The system of claim 15 wherein said searching means is unsuccessful, further comprising:

communicating means for generating and communicating a data-not-found-response to said content requestor; and data characterizer means for creating and communicating a suggested characterization data from said content requestor in said advisory mode to a suggested-queue coupled to said advisory server wherein said suggested characterization data includes data identifying said content requestor as well as said portions of said data request signal, responsive to the receipt of said portions of said data-not-found-response by said content requestor wherein said data characterization means is coupled to said content requestor.

21. The system of claim 20, further comprising:

controlling means for controlling said first advisory server to retrieve said suggested characterization data from said suggested queue; and in the event said suggested characterization data is accepted, storing means for storing said suggested characterization data in said data base.

22. The system of claim 21, wherein said controlling means further comprises:

modifying means for modifying said suggested characterization data prior to said storing said suggested characterization data in said data base.

23. The system of claim 21, wherein said controlling means further comprises:

displaying means for displaying said suggested characterization data on a display.

24. The system of claim 21, wherein said controlling said first advisory server to retrieve said suggested characterization data from said suggested queue further comprises:

prioritizing means for prioritizing said suggested queue as a function of the accept/reject ratio for prior suggested characterization data communicated from said content requestor.

25. The system of claim 21, wherein said suggested characterization data is accepted, further comprising:
 credit generating means for controlling said advisory server to generate a credit request signal responsive to said storing said suggested characterization data in said data base.

26. The system of claim 15, wherein said characterization data comprises a return code, a short string field, and a long string filed.

27. A system of creating and revising characterization data associated with content data in a distributed data communication system of a type wherein communication between a content requestor and a first content server occurs over a first communication link, and wherein said content requestor under control of user input communicates a data request signal to said first content server over said first communication link, and wherein said first content server, upon receiving said data request signal, communicates said content data to said content requestor according to said data request signal, comprising:
 a first advisory server coupled to said content requestor over a second communication link different from said first communication link wherein said first advisory server is remote from said first content server;
 a data base coupled to said first advisory server, said data base including characterization data which is linked to said portions of said data request signal;
 a characterization requestor coupled to said first advisory server over a second communication link different from said first communication link, wherein said first advisory server is remote from said first content server;
 setting means for setting said characterization requestor in an advisory mode wherein said characterization requestor communicates a request-for-review signal including portions of said data request signal, and a requester-identification signal to said first advisory server;
 a review queue coupled to said first advisory server, for storing said request-for-review signal, responsive to receipt of said portions of said request-for-review signal by said first advisory server;
 retrieving means for retrieving said portions of said request-for-review signal stored in said review queue; and
 creating means for creating and storing in said data base characterization data associated with said content data.

28. The system of claim 27, wherein said request-for-review-signal includes a billing-info signal and wherein said creating means further comprises:
 payment-request means for communicating a payment-request signal to said characterization requestor over said second communication link, wherein said payment-request signal includes the monetary charge incurred for said creating and storing in said data base said characterization data.

29. A method of creating and processing characterization data associated with content data in a distributed data communication system of a type wherein communication between a content requestor and a first content server occurs over a first communication link, and wherein said content requestor under control of user input communicates a data request signal to said first content server over said first communication link, and wherein said first content server, upon receiving said data request signal, communicates said content data to said content requestor according to said data request signal, said method comprising the steps of:
 receiving portions of said data request signal;
 searching a data base for characterization data linked to said portions of said data request signal, in response to said receiving step;
 in the event said searching for said characterization data linked to said portions of said data request signal is unsuccessful, storing said portions of said data request signal in a review queue associated with said advisory server; and
 retrieving said portions of said data request signal stored in said review queue and creating and storing said characterization data linked to said portions of said data request signal in said data base.

30. The method of claim 29, further comprising the step of:
 setting said content requestor in an advisory mode;
 said content requestor communicating said portions of said data request signal to a first advisory server over a second communication link different from said first communication link; wherein said first advisory server is remote from said first content server.

31. The method of claim 29 wherein said retrieving step is performed asynchronously to said storing said portions of said data request signal.

32. The method of claim 29, wherein said step of retrieving said portions of said data request signal comprises the steps of:
 determining that the content data associated with said portions of said data request signal are not within the scope of said first advisory server; and
 storing said portions of said data request signal on an ignore queue coupled to said first advisory server wherein said ignore queue includes a list of said portions of said data request signal for which characterization data should not be generated.

33. The method of claim 32, wherein said searching a data base comprises the steps of searching for and identifying said portions of said data request signal stored on said ignore queue.

34. The method of claim 29 wherein said step of creating and storing said characterization data linked to said portions of said data request signal in said data base comprises the step of identifying and adding said characterization data linked to said portions of said data request signal requiring periodic revision to a periodic-review queue coupled to said advisory server.

35. The method of claim 29, wherein said characterization data comprises a return code, a short string field, and a long string field.

36. The method of claim 29, wherein said searching for said characterization data linked to said portions of said data request signal is unsuccessful, comprises the steps of:
 generating and communicating a data-not-found-response to said content requestor; and
 upon receipt of said data-not-found-response, said content requestor creating and communicating a suggested characterization data to a suggested-queue, wherein said suggested characterization data includes data identifying said content requestor as well as said portions of said data request signal.

37. The method of claim 36, further comprises the steps of:
 retrieving said suggested characterization data from said suggested queue; and
 accepting and storing said suggested characterization in said data base as characterization data linked to said portions of said data request signal in said data base.

38. The method of claim 36, further comprising the steps of:

setting said content requestor in an advisory mode;

said content requestor communicating said portions of said data request signal to a first advisory server over a second communication link different from said first communication link; wherein said first advisory server is remote from said first content server;

wherein said data-not found response is communicated by said advisory server to said content requester in said advisory mode and wherein said suggested queue is coupled to said advisory server.

39. The method of claim 37, wherein said step of retrieving said suggested characterization data from said suggested queue further comprises the step of modifying said suggested characterization data prior to said storing said suggested characterization data in said data base.

40. The method of claim 37, wherein said step of retrieving said suggested characterization data from said suggested queue further comprises the step of displaying said suggested characterization data on a display.

41. The method of claim 37, wherein said step of retrieving said suggested characterization data from said suggested queue further comprises the step of prioritizing said suggested queue as a function of the accept/reject ratio for prior suggested characterization data communicated from said content requestor.

42. The method of claim 37, wherein said steps of accepting and storing said suggested characterization data further comprises the step of controlling said advisory server to generate a credit request signal responsive to said storing said suggested characterization data in said data base.

43. A method of creating and revising characterization data associated with content data in a distributed data communication system of a type wherein communication between a content requestor and a content server occurs over a first communication link, and wherein said content requestor under control of user input communicates a data request signal to said content server over said first communication link, and wherein said content server, upon receiving said data request signal, communicates said content data to said content requestor according to said data request signal, comprising the steps of:

receiving a request-for-review signal including portions of said data request signal and an identification signal;

upon receipt of said portions of said request-for-review signal, storing said request-for-review signal in a review queue; and retrieving said portions of said request-for-review signal stored in said review queue and creating and storing characterization data linked to said portions of said data request signal.

44. The method of claim 43, further comprising the steps of:

setting a characterization requestor associated with said content server in an advisory mode; and communicating said request-for-review signal over a second communication link, different from said first communication link, to an advisory server remote from said content server.

45. The method of claim 44, wherein said step of creating and storing in said data base said characterization data linked to said portions of said data request signal comprises the step of:

communicating a payment-request signal to said characterization requestor over said second communication link, wherein said payment-request signal includes the monetary charge incurred for said creating and storing in said data base said characterization data linked to said portions of said data request signal.

46. A system for creating and processing characterization data associated with content data in a distributed data communication system of a type wherein communication between a content requestor and a content server occurs over a first communication link, and wherein said content requestor under control of user input communicates a data request signal to said content server over said first communication link, and wherein said content server, upon receiving said data request signal, communicates said content data to said content requestor according to said data request signal, comprising:

a data base including characterization data which is linked to said portions of said data request signal;

searching means for searching said data base for said characterization data, responsive to receipt of said portions of said data request signal;

a review queue for storing said portions of said data request signal, in the event said searching for said characterization data is unsuccessful;

retrieving means for retrieving said portions of said data request signal stored in said review queue; and creating means for creating and storing in said data base characterization data associated with said data request signal, in response to said retrieving.

47. The system of claim 46, further comprising:

an advisory server coupled to said content requestor over a second communication link different from said first communication link wherein said advisory server is remote from said first content server, and wherein the data base is coupled to said first advisory server;

setting means for setting said content requestor in an advisory mode wherein said content requestor communicates portions of said data request signal to first advisory server over said second communication link.

* * * * *